(12) United States Patent
Dubojska-Gerber et al.

(10) Patent No.: US 12,232,919 B2
(45) Date of Patent: Feb. 25, 2025

(54) REGISTRATION DEVICE FOR THE REGISTRATION OF FACIAL TOPOGRAPHIC PARAMETERS, AND RELATED METHODS

(71) Applicant: GERBER CONDYLATOR GMBH, Zürich (CH)

(72) Inventors: Anna M. Dubojska-Gerber, Zürich (CH); Martin Epper, Dübendorf (CH)

(73) Assignee: GERBER CONDYLATOR GMBH, Au (CH)

( * ) Notice: Subject to any disclaimer, the term of this patent is extended or adjusted under 35 U.S.C. 154(b) by 383 days.

(21) Appl. No.: 17/677,416

(22) Filed: Feb. 22, 2022

(65) Prior Publication Data

US 2022/0241059 A1 Aug. 4, 2022

Related U.S. Application Data

(63) Continuation of application No. PCT/EP2020/073153, filed on Aug. 19, 2020.

(30) Foreign Application Priority Data

Aug. 23, 2019 (EP) ..................................... 19193414
Dec. 20, 2019 (EP) ..................................... 19219130

(51) Int. Cl.
*A61C 19/045* (2006.01)
*G01B 5/00* (2006.01)

(52) U.S. Cl.
CPC .......... *A61C 19/045* (2013.01); *G01B 5/0007* (2013.01)

(58) Field of Classification Search
CPC .................................................. A61C 19/045
(Continued)

(56) References Cited

U.S. PATENT DOCUMENTS 5,078,600 A 1/1992 Austin
2015/0147726 A1* 5/2015 Filtchev ............... A61C 1/0015
433/213

(Continued)

FOREIGN PATENT DOCUMENTS

DE 9305082 8/1993
DE 4211018 10/1993

(Continued)

OTHER PUBLICATIONS

International Search Report and Written Opinion dated Oct. 12, 2020 in related PCT App No. PCT/EP/2020/073153, 11 Pages.

*Primary Examiner* — Cris L. Rodriguez
*Assistant Examiner* — Sydney J Pulvidente
(74) *Attorney, Agent, or Firm* — Jones Robb, PLLC

(57) ABSTRACT

A registration device for the registration of facial topographic parameters is disclosed. The device comprises a base member, wherein the base member comprises a transverse section. The transverse section, in a central section thereof, comprises a coupling for rotationally immobile coupling to a referencing member. The base member further comprises two occlusal plane indicators extending in a posterior direction from the transverse section and is rotationally immobile connected to the transverse section. The occlusal plane indicators extend in a common plane. Two mandibular condyle indicator pointers are linked to the base member in a mobile linkage relationship allowing displacement of each mandibular condyle indicator pointer relative to the base member in a respective sagittal plane. A tragus indicator is pivotably coupled to each mandibular condyle indicator pointer. A method for using said device is further disclosed.

18 Claims, 2 Drawing Sheets

(58) Field of Classification Search
USPC ........ 600/590, 595; 73/379.02; 33/514, 513; 434/263, 264
See application file for complete search history.

(56) References Cited

U.S. PATENT DOCUMENTS

2015/0327967 A1* 11/2015 Baaske .................. A61C 13/00
                                                             433/68
2018/0147039 A1*  5/2018 Carlson .................... A61B 5/00
2019/0290411 A1*  9/2019 Olivier ................... A61C 19/05

FOREIGN PATENT DOCUMENTS

| NO | 9959497    | 11/1999 |
| WO | 0059401    | 10/2000 |
| WO | 2014146179 | 9/2014  |
| WO | 2021037619 | 3/2021  |

\* cited by examiner

REGISTRATION DEVICE FOR THE REGISTRATION OF FACIAL TOPOGRAPHIC PARAMETERS, AND RELATED METHODS

CROSS REFERENCE TO RELATED APPLICATIONS

This application is a continuation application of International Patent Application No. PCT/EP2020/073153, filed internationally on Aug. 19, 2020, which application claims priority to European Patent Application No. 19193414.0, filed on Aug. 23, 2019, and to European Patent Application No. 19219130.2, filed on Dec. 20, 2019, the entire contents each of which are incorporated by reference herein.

TECHNICAL FIELD

The present disclosure relates to a registration device as set forth in the claims, a system for the registration of facial topographic parameters, and methods of using the registration device.

BACKGROUND OF THE DISCLOSURE

In creating dental replacement, registration devices may be used which are able to register the dynamic displacement of the mandibular condyles during movements of the mandible. As such, an intraoral device may be attached to the teeth of the mandible. An extraoral registration device with pointers adjustable to be coincident with the mandibular condyles in a sagittal plane may subsequently be attached to the intraoral device. A registration card may be placed between the mandibular condyle and the pointers and in a well-defined orientation relative to the occlusal plane. When the mandible then is moved, the registration pin leaves a trace on the registration card which represents the displacement of the mandibular condyle relative to the skull during the mandibular movements. With the adjustment of the registration device fixed, once the registration device is attached to the mandible through the intraoral device, thus being in a fixed relationship to the occlusal plane, and the mandibular condyle pointers being coincident with the mandibular condyles, the registration device may, according to the current state of the art, be shipped to a dental laboratory. A dental technician with knowledge of the geometric parameters of the mandible which are "frozen" by the registration device, and the registered trace of the mandibular condyle during mandibular movement, is enabled to reproduce in detail the kinematics of the mandible and the teeth, and in particular the chewing surfaces, in the lab and adapt the dental restorations accordingly. However, it is extremely important that the settings of the registration device which are adjusted during the registration procedure are not altered. The trend to have dental labs more and more centralized and remote from dentists' offices requires shipping the registration devices over increasing distances. The risk of misadjustment of the settings is thus increased.

It might be of interest to register the joint axis of the mandible in relation to a reference axis of the skull. Said reference axis may be defined between the respective tragus on each side of the head, or the bone structure underlying the tragus on each side of the skull, respectively.

It might in other aspects be of interest to register the Camper's plane besides the occlusal plane. The Camper's plane is defined between the respective tragus on the bone on both sides of the skull and the spina nasalis anterior. The Camper's plane and the occlusal plane should be at least essentially parallel to each other. Deviations from this ideal condition has a negative impact on the esthetic appearance of a face, which might be corrected by a dental restoration/rehabilitation. It might be a pathological finding and indicate some disease, deformation, or past or current injury. Simultaneously registering the occlusal plane and the Camper's plane may thus be of interest not only in dentistry, but also in forensics or archeology. It is emphasized, however, that the mere finding is not a diagnoses per se but needs to be assessed by a medical professional.

In another aspects, esthetics are increasingly important in dentistry. However, certain parameters which beforehand appear to be tied to esthetics may also be functionally important. For instance, the length of the upper incisors may have an impact on the phonetic repertoire of an individual. Incorrect length of the upper incisors may be tied to stigmatism or impairment of the phonetic repertoire. Evaluation of according parameters may even give hints at the phonetic repertoire of a deceased individual, which may be of interest in archaeology and paleontology.

OUTLINE OF THE SUBJECT MATTER OF THE PRESENT DISCLOSURE

It is an object of the present disclosure to provide a registration device of the type initially mentioned. In more specific aspects, it is an object of the present disclosure to provide a registration device which mitigates the above-mentioned issues. It may be considered the object of the present disclosure to provide a registration device which allows simultaneous registration of a multitude of facial topographic parameters. In a still more specific aspect, it is an object of the herein disclosed subject matter to provide a device which allows simultaneous registration of the occlusal plane and the Camper's plane. In an even still more specific aspect, a registration device shall be suggested which allows the registration of fascial topographic parameters pertaining to esthetics.

In another aspect, a method for achieving the aforementioned objectives is disclosed.

This is achieved by the subject matter described in the independent claims.

Further effects and advantages of the disclosed subject matter, whether explicitly mentioned or not, will become apparent in view of the disclosure provided below.

Accordingly, disclosed is a registration device for the registration of facial topographic parameters, comprising a base member, wherein the base member comprises a transverse section and having an anterior side and a posterior side. The transverse section, in a central section thereof, comprises a coupling means for rotationally immobile coupling to a referencing member. The coupling means is in particular provided such that the referencing member, when coupled to the base member, extends on a posterior side of the base member. In embodiments, the coupling means are provided on the posterior side of the base member. The base member further comprises two occlusal plane indicators, wherein on each lateral side of the transverse section an occlusal plane indicator extends in a posterior direction from the transverse section and is rotationally immobile connected to the transverse section. The occlusal plane indicators extend in a common plane. Further, the device comprises two mandibular condyle indicator pointers. Each mandibular condyle indicator pointer is linked to the base member in a mobile linkage relationship allowing displacement of each mandibular condyle indicator pointer relative to the base member in a respective sagittal plane. This plane is referred to as a sagittal plane for the following reasons. The device is intended to be attached to a skull such that the plane in which the mandibular condyle indicator pointers is displaceable is at least essentially coincident with a sagittal plane. It is to this extent understood that in particular the planes in which each mandibular condyle indicator pointer is displaceable are parallel to each other. These sagittal planes are perpendicular to the common plane of the occlusal plane indicators, and the mandibular condyle indicator pointers are provided on different lateral sides of the central section of the transverse section. In aspects, the mandibular condyle indicator pointers are provided so as to allow pivoting movement around a pivoting axis and a transitional movement perpendicular to said pivoting axis. Further, a tragus indicator is pivotably coupled to each mandibular condyle indicator pointer, wherein a pivot axis of each tragus indicator is coincident with an axis of the respective mandibular condyle pointer. The device comprises, on each lateral side, a mandibular condyle indicator pointer and a tragus pointer, and thus allows the registration of the relative positions of the tragus and the mandibular condyle on each lateral side of a head or skull. Thus, it can be determined whether the linkage of the mandible to the skull is symmetric on both lateral sides of the head or skull.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

The mandibular condyle indicator pointers may be pointed rods or pins, with a respective axis extending perpendicular to the sagittal plane in which they are displaceable and/or parallel to the common plane of the occlusal plane indicators. The tragus indicators may in particular be pivotable around said respective axes of the mandibular condyle indicator pointers. The tragus indicators themselves may comprise tragus pointers, which may also be provided as pointed rods or pins. In more particular embodiments, an axis of the tragus pointer is parallel to an axis of the mandibular condyle indicator pointer to which it is pivotably linked. The distance from the tragus pointer to the respective pivot axis of the tragus indicator may be fixed.

The distance between mandibular condyle indicator pointers on the different lateral sides of the device, and thus, implicitly, between the tragus indicators on the different lateral sides of the device, may be variable so as to allow adjustment of said distance. In exemplary non-limiting aspects it may be provided that the mandibular condyle indicator pointers are displaceable along a pivot axis around which the mandibular condyle indicator pointers are pivotable in the respective sagittal plane. In more specific exemplary aspects this may be a common pivot axis of both mandibular condyle indicator pointers. In this respect the mandibular condyle indicator pointers are in particular displaceable, relative to each other and relative to the base member, in a lateral direction, that is, perpendicular to the sagittal planes.

In other exemplary aspects the registration device may comprise two mandibular condyle indicator beams, wherein on each lateral side of the transverse section a mandibular condyle indicator beam is pivotably coupled to the transverse section and pivotable around a pivot axis. To this extent, in exemplary embodiments, an axle may be provided and/or extending on each lateral side of the base member. Each axle may in particular extend in a transverse direction, parallel to the common plane of the occlusal plane indicators and perpendicular to the sagittal plane. A mandibular condyle indicator beam, in said embodiments, is pivotably mounted to and pivotably around each axle. Moreover, the mandibular condyle indicator beam may be displaceable along the respective axle. As suggested above, the pivot axis of both mandibular condyle indicator beams may be coincident, that is, the mandibular condyle indicator beams are pivotable around a common axis. The axles to which the mandibular condyle indicator beams are, in embodiments, pivotably mounted may in particular be coaxial. It is understood in this respect that the pivot axis of a mandibular condyle indicator beam in respective embodiments is identical with an axis of the axle to which the mandibular condyle indicator beam is pivotably mounted. In exemplary embodiments the mandibular condyle indicator beams are pivotable in a sagittal plane. One of the mandibular condyle indicator pointers is coupled to each one of the mandibular condyle indicator beams and distant from the respective pivot axis, wherein the distance between the mandibular condyle indicator pointer and the respective pivot axis is variable so as to enable adjustment of said distance. The mandibular condyle indicator pointers are thus displaceable along the mandibular condyle indicator beams. In more specific aspects, each mandibular condyle indicator beam individually is axially displaceable relative to the base member along the respective pivot axis. More in particular, said displacement along the respective pivot axis is a displacement in a lateral direction.

More specific exemplary embodiments of the registration device comprise a spina nasalis anterior indicator. The spina nasalis anterior indicator comprises a spina nasalis anterior pointer attached to the transverse section of the registration device. The attachment of the spina nasalis anterior pointer is provided such that the spina nasalis anterior pointer is displaceable with respect to said transverse section such that a distance between the spina nasalis anterior pointer and the occlusal plane, that is the common plane of the occlusal plane indicators is variable so as to allow adjustment of said distance. In brief, the spina nasalis anterior pointer is intended to be placed with a tip pointing at the spina nasalis anterior. The tragi and the spina nasalis anterior define the Camper's plane of the skull. Hence, if the tragus indicators are correctly placed at the tragi on each side of the skull and the spina nasalis anterior pointer is correctly placed at the spina nasalis anterior, the device registers the Camper's plane. It is thus possible to register the relative positions and orientations of the occlusal plane and the Camper's plane. To this extent the spina nasalis anterior indicator, in embodiments, comprises a spina nasalis anterior indicator rod releasably attachable to the base member, wherein the spina nasalis anterior pointer is displaceable along the spina nasalis anterior indicator rod in an axial direction of the spina nasalis anterior pointer rod, and wherein the spina nasalis anterior indicator rod extends at least approximately perpendicular to the occlusal plane, which is defined as a plane parallel to or coincident with the common plane of the occlusal plane indicators.

It may further be provided that the registration device comprises an esthetic parameters registration rod attachable to the base member so as to extend at least approximately perpendicular to the common plane of the occlusal plane indicators, wherein the esthetic parameters registration rod is axially displaceable relative to the base member and in particular may extend on both sides of the common plane of the occlusal plane indicators and/or the transverse section of the base member. It may further be provided that, when the esthetic parameters registration rod is attached to the base member, on each side of the common plane of the occlusal plane indicators at least one indicator device is displaceably attached to the esthetic parameters registration pin. The esthetic parameters registration rod together with the indicator devices may be used to register certain proportions which, alone or in relation to each other, are decisive for the esthetic appearance of a face, that is, for instance, the ratio of the distance from the corner of the eye to the labial angle in relation to the distance from the spina nasalis anterior to the base of the chin, or the length of the upper incisors. The latter dimension is also important for phonetics, as it might restrict the phonetic repertoire or cause lisp. Besides the relevance for the esthetic outcome of a dental restoration, registering topographic parameters of a skull may be useful in archeology, paleontology and forensics. Registering these parameters, along with other parameters conceivable by means of the registration device, from a skull might improve the ability to reconstruct a face and may provide hints to, for instance, the phonetic characteristics of an individual or population leaving in the past.

In a further aspect a system for the registration of facial topographic parameters is disclosed. The system comprises a registration device according to any embodiment outlined above and a referencing member. The referencing member is a referencing plate having a principal plane and comprises a coupling means adapted and configured to mate with the coupling means of the transverse section of the registration device, so as to rotationally immobile couple the referencing plate to the registration device. In particular embodiments the coupling means of the referencing plate and the transverse section are mutually adapted and configured to couple the referencing plate to the registration device in a position in which the principal plane of the referencing plate is parallel to the common plane defined by the occlusal plane indicators. In more particular embodiments the coupling means of the referencing plate and the transverse section are mutually adapted and configured to attach the referencing plate to the registration device with the principal plane of the referencing plate coincident with the common plane defined by the occlusal plane indicators. Further, the coupling means of the referencing plate and the transverse section are mutually adapted and configured to attach the referencing plate to the registration device so as to extend posteriorly from the base member and in the posterior direction. The referencing member may in embodiments be referred to as an intraoral plate. As will be appreciated by virtue of the description below the referencing member is intended to be placed inside an oral cavity when used in dental medicine or esthetic dentistry. However, in other applications, such as for instance forensic dentistry, archeology or paleontology, the referencing member is merely attached to a mandible rather than being placed inside an intraoral cavity. It is emphasized that the primary function of the referencing member is to reference the occlusal plane of an individual, whether life or deceased, and the primary intended use thus is to firmly place it on to the top of the teeth of a mandible. The referencing plate may in embodiments comprise through openings on its face, and more particularly openings are provided in areas where the referencing plate is intended to be placed on the teeth. This allows for instance appliances like medical silicon used to affix the referencing plate to the teeth to escape the gap between the referencing plate and the teeth and thus to place the referencing plate as close to the chewing surface as possible, so as to as close as possible reference the occlusal plane.

In still a further aspect a method for registering facial topographic parameters of a face is disclosed. The method comprises attaching a referencing plate to a mandible on top of the teeth of the mandible and affixing the referencing plate to the teeth of the mandible, whereby a principal plane of the referencing plate at least essentially is coincident with an occlusal plane of the mandible. It will be readily understood that in dental medicine or esthetic dentistry this implicitly also means placing the referencing plate inside an oral cavity. Adhesives like for instance medical grade silicone may be used for affixing the intraoral plate to the teeth. A registration device of any type as set forth above is subsequently coupled to the referencing plate. It is understood that in dental medicine and esthetic dentistry the registration device is placed outside the oral cavity. The occlusal plane indicators are parallel to the principal plane of the referencing plate, or, in more particular embodiments, extend in in a plane coincidental with the principal plane of the referencing plate, thus well visibly indicating the occlusal plane outside the oral cavity. The method further comprises displacing the mandibular condyle indicator pointers in their respective sagittal plane on each side of the referencing plate and placing each mandibular condyle indicator pointer coincident with a mandibular condyle on each side of the referencing plate in a sagittal plane, so as to mark the position of the mandibular condyles of the mandible on each side of the referencing plate. Thus, a line connecting the mandibular condyle indicator pointers on each side of the occlusal plane indicators is registered, wherein said axis is the articular axis of the mandible, or mandibular axis. Once the mandibular condyle indicator pointers are in the required position the displacement capability of the mandibular condyle indicator pointers relative to the base member may in embodiments be locked. The tragus indicators on each side of the transverse section, or on each side of the referencing plate, respectively, are pivoted around the respective tragus indicator pivot axis. In particular, the tragus indicator pivot axis may be coincident with the mandibular axis. On each lateral side a tragus indicator pointer is positioned on a line connecting the mandibular condyle and the respective tragus. Once the referencing device is accordingly adjusted, the method comprises reading at least one parameter indicative of a distance from the occlusal plane to the mandibular condyle indicator pointers perpendicular to the occlusal plane and an anterior-posterior position of the mandibular condyle indicator pointers parallel to the occlusal plane, and further reading at least one parameter indicative of a distance from the occlusal plane to the tragus indicator pointers perpendicular to the occlusal plane and an anterior-posterior position of the tragus indicator pointers parallel to the occlusal plane. It will be readily understood that the anterior-posterior positions may be read from any defined reference position or landmark, such as, for instance, from the posterior side of the base member.

The registration device may in embodiments comprise two mandibular condyle indicator beams, wherein on each lateral side of the transverse section of the registration device a mandibular condyle indicator beam is pivotably coupled to the transverse section and pivotable around a pivot axis, wherein the mandibular condyle indicator beams are pivotable in a sagittal plane. One of the mandibular condyle indicator pointers is coupled to each one of the mandibular condyle indicator beams and distant from the respective pivot axis of the mandibular condyle indicator beam, wherein the distance between the mandibular condyle indicator pointer and the respective pivot axis is variable so as to allow adjustment of said distance. Hence, when the registration device is coupled to the referencing plate one mandibular condyle indicator beam is provided on each lateral side of the referencing plate. The herein disclosed method may then further comprise pivoting the mandibular condyle indicator beams around their respective pivot axis, thereby varying an inclination angle between the mandibular condyle indicator beams and the occlusal plane indicator on each side of the registration device, and displacing the mandibular condyle indicator pointers along the respective mandibular condyle indicator beam, thereby varying the distance between the mandibular condyle indicator pointer and the respective pivot axis of the mandibular condyle indicator beam on each side of the transverse anterior portion. In embodiments when the respective mandibular condyle indicator beam is positioned to overlap the respective mandibular condyle, the pivoting degree of freedom of the mandibular condyle indicator beams around the respective pivot axis on each side of the transverse section may be locked, thereby fixing the inclination angle between the respective mandibular condyle indicator beam and occlusal plane indicator, and, when the mandibular condyle indicator pointers are positioned coincident with the respective mandibular condyle, further a transitional degree of freedom between the mandibular condyle indicator pointer and the respective pivot axis of the mandibular condyle indicator beam on each side of the transverse section may be locked, thereby the fixing the distance between the mandibular condyle indicator pointers and the respective pivot axis.

It is understood that in embodiments the pivot axes of the two mandibular condyle indicator beams are coincident.

Embodiments of the method may also comprise displacing the mandibular condyle indicator pointers laterally, that is, perpendicular to the respective sagittal plane. In more particular embodiments this may comprise displacing the mandibular condyle indicator beams along their respective pivot axis. The method may then further comprise reading a parameter indicative of a lateral position of the mandibular condyle indicator pointers relative to each other and hence of the distance between the two mandibular condyle indicator beams, which in turn provides an indication for the lateral distance between the mandibular condyles.

The registration device may in embodiments be equipped with measuring templates to facilitate the reading and transfer of the respective parameters.

The method may further comprise transferring the readings to a remote device, in particular so as to transfer landmarks of the facial topography to a remote location, in particular for assessing the functional and esthetic effect of a dental restoration.

It is noted that the methods disclosed above do not comprise therapeutic or diagnostic steps, but merely comprises steps used to register certain topographic landmarks which enable a dentist to carry out a diagnosis or plan therapeutic steps subsequently. Certain uses of the method aim at improving the esthetic outcome of dental restoration. It is further noted that, as outlined above, the method cannot only be usefully carried out at a living individual, but may also be usefully applied to a deceased individual, for instance in forensics or archeology or paleontology. To this extent the method may also be usefully applied to any real or artificial skull.

In yet further aspects, a system for the registration of facial topographic parameters comprises a registration device of any kind mentioned above and a stand from which the registration device can be suspended. In essence it may be provided that the stand and the registration device are provided such that the registration device can by attached to the stand at the base member and freely cantilevers from the stand. The registration device is accordingly suspended from the stand after the facial topographic parameters have been registered so as to avoid misadjustment of the registration device and loss of adjustment.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 an exemplary embodiment of a device as set forth above.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

Figure 1:
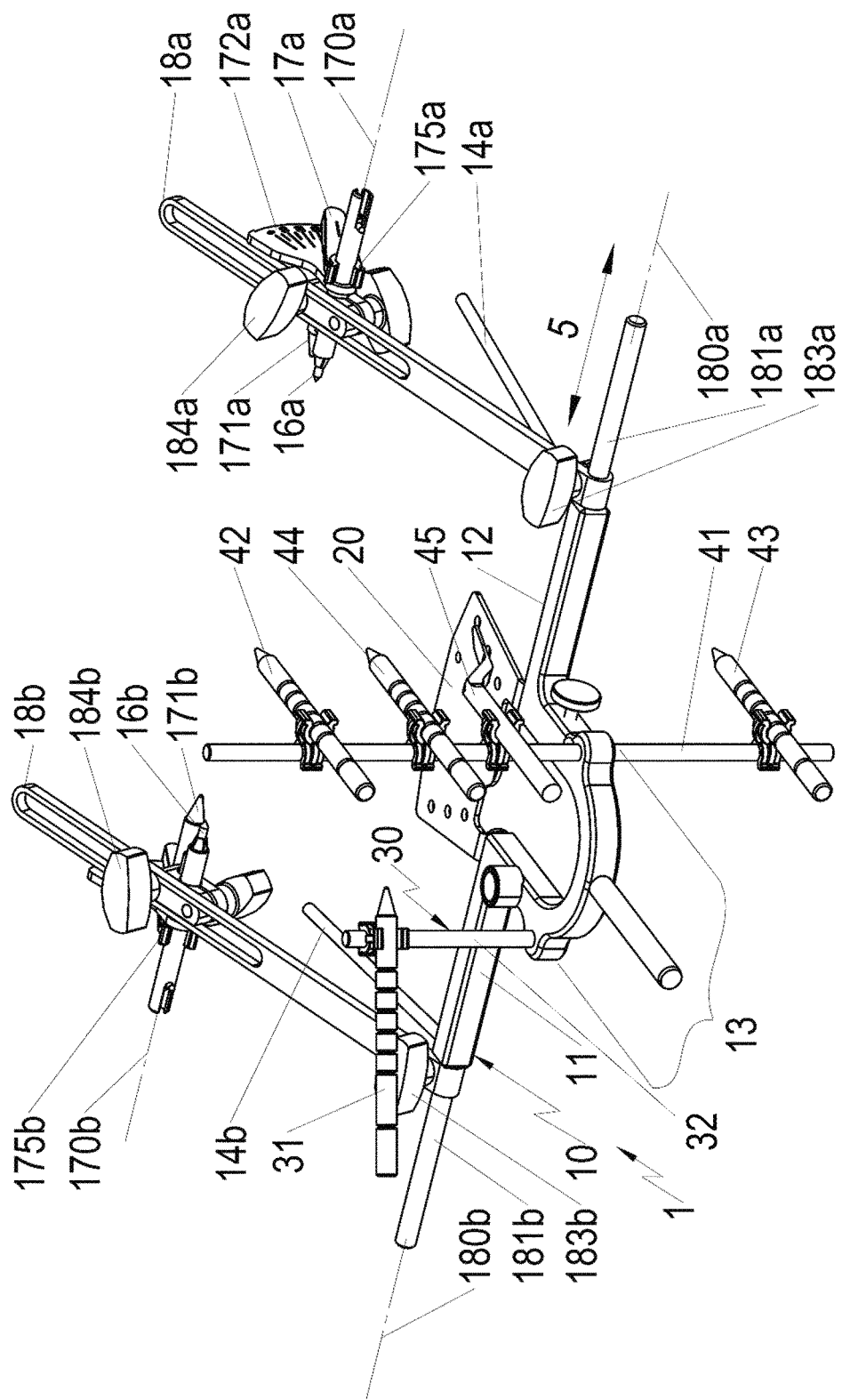

FIG. 1 shown an exemplary embodiment of a system for the registration of facial topographic parameters comprising a registration device as further set forth herein and a referencing plate 20 coupled to the registration device. The registration device comprises a base member 1 having a transverse section 10. The base member further comprises an anterior side 11 and a posterior side 12. When used as intended the anterior side is located anteriorly and the posterior side is located posteriorly when referenced to a head or skull. The transverse section 10, in a central section 13 thereof, comprises a coupling means for coupling the referencing member or referencing plate to the posterior side of the base member. A central area 13 of the transverse section is arched and protrudes anteriorly so as to facilitate handling of the device. The coupling means are provided so as to achieve a rotationally immobile coupling of the referencing member 20 to the base member with the referencing member extending posteriorly. Hence, when the referencing member is coupled to the base member, for instance a principal plane of the referencing plate 20 has an angularly fixed and well-defined relationship in relation to the orientation of the base member. For one instance, the transverse section may extend parallel to the principal plane of the referencing plate, and, in more specific embodiments, in the principal plane of the referencing plate, as shown in the exemplary embodiment. The referencing plate is intended to be placed on top of the teeth of a mandible. The principal plane of the referencing plate then is at least essentially identical with the occlusal plane of the mandible. The transverse section consequently extends at least essentially parallel to the occlusal plane, and in more specific embodiments in the occlusal plane. It is understood that, when the system is applied to, for instance, a living individual, the referencing plate 20 is placed intraorally, while the registration device to which it is coupled is placed extraorally. The base member further comprises two occlusal plane indicators 14a, 14b cantilevering posteriorly from the transverse section. The occlusal plane indicators are rotationally immobile attached to the transverse section. Moreover, the occlusal plane indicators extend in a common plane. The occlusal plane indicators are further arranged such that when the referencing plate is coupled to the base member, the occlusal plane indicators extend parallel to the principal plane of the referencing plate, such that the common plane of the occlusal plane indicators is at least essentially parallel, or, in embodiments, at least essentially coincident with the principal plane of the referencing plate 20. The skilled person will readily appreciate that the principal plane of the referencing plate is the plane in which the major area of the plate extends. It is to this extent noted that a plate is generally defined as having an area and a thickness, wherein the thickness is smaller than the size of the area. Thus, when the referencing plate is arranged as intended, the occlusal plane indicators provide an extraoral indication to the occlusal plane. Mandibular condyle indicator beams 18a, 18b are coupled to the base member and are pivotable around a respective pivot axis 180a, 180b. In the specific exemplary embodiment, the pivot axis 180a and 180b are coincident, and hence the mandibular condyle indicator beams 18a, 18b are pivotable around a common pivot axis. Moreover, each mandibular condyle indicator beam is transitionally displaceable in a lateral direction indicated at 5 so that the distance between the mandible indicator beams in the lateral direction is variable to allow adjustment of said distance. It will be appreciated that in the exemplary embodiment shown each mandibular condyle indicator beam is pivotable around and displaceable along a common pivot axis. On each lateral side of the base member 1, or the transverse section 10, respectively, an axle 181a, 181b cantilevers from the base member and in a transverse direction. Axles 181a and 181b are coaxial. The mandibular condyle indicator beams are pivotably mounted to the axles and further displaceable along the axial direction of the axles. Screws 183a, 183b are provided to selectively lock displacement and pivoting of the mandibular condyle indicator beams. In non-depicted embodiments scales are provided on the axles and allow to take a reading indicative of the distance between the mandibular condyle indicator beams in the lateral direction.

Mandibular condyle indicator pointers 16a, 16b are mounted to the mandibular condyle indicator beams and linearly displaceable along the respective mandibular condyle indicator beam. Screws are provided to selectively lock the displacement of the mandibular condyle indicator pointers along the mandibular condyle indicator beams. It is noted that generally, where the exemplary embodiment shown has screws for locking certain degrees of freedom, other suitable locking mechanisms may be applied. Further, on each side of the device a tragus indicator 17a, 17b is pivotably coupled to the respective mandibular condyle indicator pointer. Each tragus indicator is pivotable around a tragus indicator pivot axis 170a, 170b. In particular, the tragus indicator pivot axes 170a, 170b are coaxial with an axis of the respective mandibular condyle indicator pointer 16a, 16b. This will be outlined in more detail below when discussing exemplary use of the registration device. The tragus indicators are, in the embodiment shown, pivotably and axially displaceably coupled to the mandibular condyle indicator by biased spring clips 175a, 175b partly embracing the mandibular condyle indicator. The biasing force is chosen such that, without applying external force, the biasing clip frictionally locks on the mandibular condyle indicator, wherein the frictional locking force is sufficient to avoid movement by the weight of a tragus indicator. The arrangement of mandibular condyle indicators and tragus indicators is, for one side of the registration device, shown in more detail in FIGS. 2 and 3.

Figure 2:
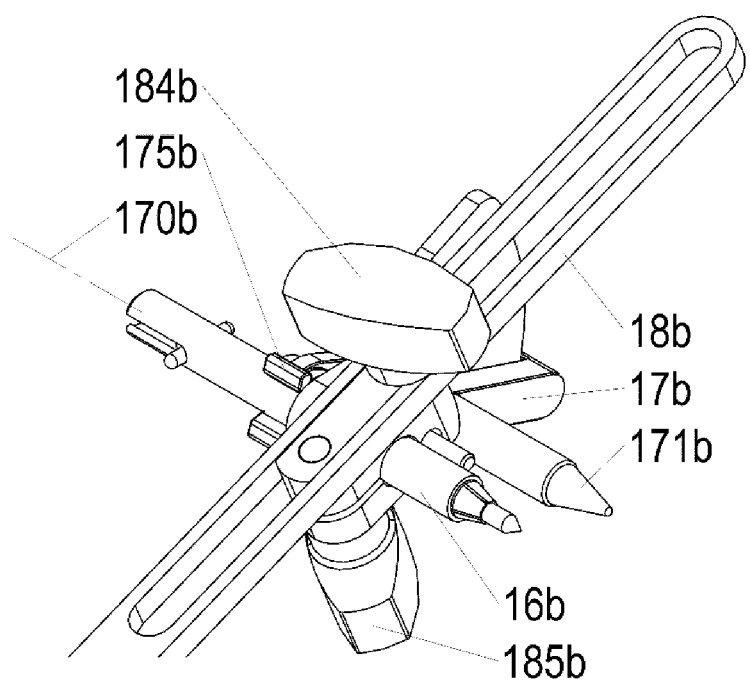
FIG. 2 a detail of the device.
Figure 3:
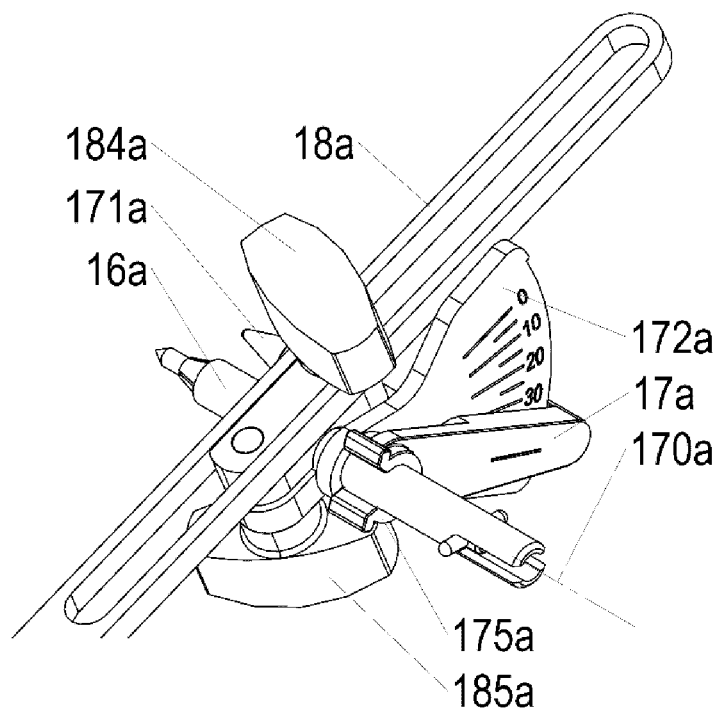
FIG. 3 a similar detail as in FIG. 2 on the other side of the registration device and in a different perspective.

FIG. 2 shows a detail including a mandibular condyle indicator pointer 16b, a tragus indicator 17b and a part of a mandibular condyle indicator beam 18b in a view direction from medial to lateral. FIG. 3 shows a similar detail on the other side of the registration device in a view direction from lateral to medial. As can be seen, mandibular condyle indicator pointer 16b and tragus indicator 17b with tragus indicator pointer 171b are jointly mounted to mandibular condyle indicator beam 18b in a manner so as to be displaceable along a longitudinal extent of mandibular condyle indicator beam 18b. Said translatory degree of freedom can be selectively locked and unlocked by screw 184b. FIG. 2 provides a view on the tips of pointers 16b, 171b. The tip of mandibular condyle indicator pointer 16b is retractably received in a bushing and can be locked inside the bushing by screw 185b. Turning to FIG. 3, which shows the similar detail as FIG. 2, on the other side of the registration device, it is seen how tragus indicator 17a is coupled to the bushing of mandibular condyle indicator pointer 16a by biased spring clip 175a and pivotable around axis 170a of the mandibular condyle indicator pointer. It is further seen how tragus indicator 17a extends yoke-shaped around an angular scale plate 172a. The angular scale provided on angular scale plate 172a provides for a possibility to directly read an inclination angle between mandibular condyle indicator beam 18a and the lever of tragus indicator 17a.

The registration device further, optionally, comprises a spina nasalis anterior indicator 30. The spina nasalis anterior indicator 30 comprises a spina nasalis anterior indicator rod 32 which is attachable to the transverse section 10 of the base member 1. The spina nasalis indicator rod is received in a through opening of the transverse section extending at least essentially perpendicular to the common plane of the occlusal plane indicators. Rod 32 is displaceable with respect to the base member along the axis of rod 32. Spina nasalis anterior indicator rod 32 is screwed into base member 1 by. A spina nasalis anterior pointer 31 is attachable to the spina nasalis anterior indicator rod 32 and is displaceable along the spina nasalis anterior indicator rod. Spina nasalis anterior pointer 31 is connected to the spina nasalis anterior indicator rod by a spring clip, similar to those described in connection with the coupling of the tragus indicators to the mandibular condyle indicators and is frictionally locked without the application of an external force, but may manually be displaced along and pivoted around the rod 32 by an operator. The spina nasalis anterior indicator and rod allow to register a parameter indicative of the distance between the spina nasalis anterior pointer and the common plane of the occlusal plane indicators and hence the occlusal plane.

In further aspects, the registration device, optionally, comprises an esthetic parameters registration rod 41 attachable to the transverse section 10 of base member 1. Esthetic parameters registration rod 41 is received through a through opening in the transverse section 10. Preferably, on each side of the common plane of the occlusal plane indicators at least one indicator device 42, 43, 44, 45 is releasably attached to the esthetic parameters registration rod and displaceable along the esthetic parameters registration rod. Each of indicator devices 42, 43, 44, 45 is connected to rod 41 by a biased spring clip in a manner as outlined above.

For the registration of facial topographic parameters of a face, first the referencing plate 20 is attached on the top of the teeth of the mandible and fixed to the teeth of the mandible. Said fixation may in particular be achieved in a conventional way, for instance by silicon placed between referencing plate 20 and the top of the teeth of the mandible. A principal plane of the referencing plate then is, at least essentially, coincident with the occlusal plane. The referencing plate may, as noted above, comprise openings to allow a surplus of the silicon to the leak from the space between the teeth and the referencing plate. A registration device as described by any of the above embodiments is subsequently attached to the referencing plate on an anterior side of the referencing plate. By virtue of the functional interaction of the respective coupling means provided on the base member 1 of the registration device and the referencing plate 20 it is ensured that the occlusal plane indicators 14a and 14b extend parallel to the occlusal plane, or the principal plane of the referencing plate, respectively. In embodiments, occlusal plane indicators 14a and 14b may extend at least essentially in the occlusal plane. It will be appreciated that, if the method is carried out on a living individual or a skull comprising soft tissue, the referencing plate is located intraorally, and visibility of the referencing plate, if any, is strongly restricted. The registration device, however, is located extraorally and hence the occlusal plane indicators provide an extraoral reference to the occlusal plane. It will further be appreciated that the coupling between the transverse section of the registration device and a referencing plate must be rotationally immobile so as to ensure the above-described functionality. With locking screws 183a, 183b, 184a, 184b unlocked the mandibular condyle indicator pointers 16a and 16b are placed coincident with the mandibular condyle on each side of the referencing plate in a sagittal plane, so as to mark the position of the mandibular condyle on each side of the referencing plate. With the device exemplarily shown in FIGS. 1 and 2, the position of each mandibular condyle pointer is locked in coincidence with a mandibular condyle in locking screws 183a and 184a, and 183b and 184b, respectively, thereby locking the displacement capability of the mandibular condyle indicator pointers relative to the base member. The distance of a mandibular condyle from the common plane of the occlusal plane indicators 14a and 14b may be read and recorded. Moreover, a parameter representative of the lateral distance between the mandibular condyles may be obtained in reading the lateral distance between the mandibular condyle indicator beams parallel to axles 181a and 181b. Those readings may also be recorded. Tragus indicators 17a and 17b are subsequently pivoted around their respective tragus indicator pivot axis 170a and 170b and the tragus indicator pointers 171a and 171b are positioned on a line connecting the mandibular condyle and the respective tragus on each side of the skull. The biasing force of spring clips 175a, 175 is sufficient to lock the tragus indicators on the mandibular condyle indicators when not being manipulated. A value can then be read which is indicative of the distance of the tragi on each side of the skull from the common plane of the occlusal plane indicators, or the occlusal plane, respectively. It may be of interest whether the tragi on both sides of the skull are symmetric with respect to the occlusal plane. Normally, a pivoting axis of the mandible, defined by the two mandibular condyles on each side of the skull, should be, at least essentially, parallel to the Camper plane. A deviation from parallelism may be used by a medical professional or a dental technician to diagnose a pathologic condition. Moreover, the resulting non-symmetry may yield a negative impact on the esthetic appearance of an individual. The negative impact of such condition may for instance be corrected during manufacturing dental restorations. In archaeology such findings may give an indication to the health conditions of a deceased individual or an ancient population. In forensics such findings may for instance be of interest in the comparison of bite marks. The recorded readings may be transferred to a remotely located registration device so as to transfer the recorded landmarks of the facial topography to a remote location. In embodiments, the remotely located device may be located in a dental lab so as to allow a dental technician to copy the recorded conditions and improve the outcome of manufacturing dental restorations, without the need to ship the registration device and hence without the risk to chance adjustment of the various pointers during shipping.

Further, the spina nasalis anterior indicator rod 32 may be inserted into the respective opening of the base member and spina nasalis anterior pointer 31 be placed with its tip coincident with or pointing towards the spina nasalis anterior. The camper plane is defined as being span between the tragi and the spina nasalis anterior. The registration device is then set to indicate, between tips of the tragus indicator pointers 171a, 171b and the tip of spina nasalis anterior pointer 31, the Camper's plane of the skull to which it is attached. On the other hand, the occlusal plane indicators 14a, 14b provide an indication of the position and/or orientation of the occlusal plane. It can then be easily determined whether the occlusal plane and the Camper's plane are parallel to each other, and, if not, the magnitude and orientation of a misalignment can be assessed. Also, the distance between the Camper's plane and the occlusal plane is registered in the registration device. Such data can, on the one hand, be useful to improve the esthetic and functional outcome of prosthetic dentistry. On the other hand, such measurement may provide useful data about deceased individuals or populations in archaeology, and may moreover be found useful in forensics.

The esthetic parameters registration rod 41 may be attached to the base member in inserting it into the respective opening of the base member. Indicator devices 42 and 43 may subsequently be attached to the esthetics parameters registration rod 41. Lower indicator device 43 may be placed at the chin, while for instance upper indicator device 45 may be placed under the lower edge of the upper incisors. Indicator devices 42 and 44 may be set to indicate further landmarks of interest.

With all these registration steps taken, a comprehensive picture of facial topographic parameters, as far as the masticatory apparatus is concerned, is registered. For instance, the distance of the spina nasalis anterior and the base of the chin from each other and from the occlusal plane is registered. Also, the position of the mandibular condyles and the tragi relative to the occlusal plane is registered. Besides the improvement of the outcome of prosthetic dentistry in terms of functionality and esthetics such knowledge may, as previously mentioned, be found useful in other fields, such as, for a non-limited instance, in improving reconstructing the appearance of a face from a skull.

Summarizing, the herein described registration device is found useful, while the following list is not comprehensive, in being applied to a living individual for improving the outcome of prosthetic dentistry in terms of function as well as in terms of esthetics, but also, for instance, for assigning bite marks to an individual. It may also be useful when being applied to a deceased individual in forensics. It may moreover be useful in archaeology when being applied to a deceased individual or a sample of individuals of a deceased population, so as to, for instance, receive an impression of the appearance of deceased individuals at lifetime or the health status of ancient individuals or populations. It is noted, however, that the registration of landmarks achieved by the herein disclosed methods does not include a diagnostic, let alone a therapeutic, step per se, but the thus received data can only provide the basis for a diagnosis, and potential subsequent therapeutic steps, by a medical professional.

While the subject matter of the disclosure has been explained by means of exemplary embodiments, it is understood that these are in no way intended to limit the scope of the claimed subject matter. It will be appreciated that the claims cover embodiments not explicitly shown or disclosed herein, and embodiments deviating from those disclosed in the exemplary modes of carrying out the teaching of the present disclosure will still be covered by the claims.

What is claimed is:

1. A registration device for the registration of facial topographic parameters, comprising:
   a base member comprising:
      an anterior side, a posterior side, and a transverse section, wherein a central section of the transverse section comprises a rotationally immobile coupling configured to couple the transverse section to a referencing member; and
      two occlusal plane indicators extending in a common plane, a respective occlusal plane indicator extending in a posterior direction on each lateral side of the transverse section, each occlusal plane indicator being rotationally immobile connected to the transverse section; and
   two mandibular condyle indicator pointers, each mandibular condyle indicator pointer being linked to the base member in a mobile linkage relationship allowing displacement of each mandibular condyle indicator pointer relative to the base member in a respective sagittal plane,
      wherein the respective sagittal planes are perpendicular to the common plane of the occlusal plane indicators, and the mandibular condyle indicator pointers are provided on different lateral sides of the central section of the transverse section, and
      wherein a tragus indicator is pivotably coupled to each mandibular condyle indicator pointer and a pivot axis of each tragus indicator is coincident with an axis of the respective mandibular condyle indicator pointer.

2. The registration device of claim 1, wherein each tragus indicator comprises a tragus pointer.

3. The registration device of claim 1, wherein a distance between the two mandibular condyle indicator pointers in a lateral direction is variable.

4. The registration device of claim 1, further comprising two mandibular condyle indicator beams, wherein, on each lateral side of the transverse section, a mandibular condyle indicator beam is pivotably coupled to the transverse section and pivotable around a pivot axis, wherein the mandibular condyle indicator beams are pivotable in a sagittal plane, and wherein one of the mandibular condyle indicator pointers is coupled to each one of the mandibular condyle indicator beams and distant from the respective pivot axis, a distance between the mandibular condyle indicator pointer and the respective pivot axis being variable.

5. The registration device of claim 4, wherein the mandibular condyle indicator beams are pivotable around a common axis.

6. The registration device of claim 4, wherein each mandibular condyle indicator beam individually is axially displaceable relative to the base member along the respective pivot axis.

7. The registration device of claim 1, further comprising a spina nasalis anterior indicator, the spina nasalis anterior indicator comprising a spina nasalis anterior pointer attached to the transverse section, the spina nasalis anterior pointer being displaceable with respect to the transverse section such that a distance between the spina nasalis anterior pointer and the common plane of the occlusal plane indicators is variable.

8. The registration device of claim 7, wherein the spina nasalis anterior indicator comprises a spina nasalis anterior indicator rod releasably attachable to the base member, wherein the spina nasalis anterior pointer is displaceable along the spina nasalis anterior indicator rod, and wherein the spina nasalis anterior indicator rod extends at least approximately perpendicular to the common plane of the occlusal plane indicators.

9. The registration device of claim 1, wherein an esthetic parameters registration rod is attachable to the base member to extend at least approximately perpendicular to the common plane of the occlusal plane indicators, and wherein the esthetic parameters registration rod, when attached to the base member, is axially displaceable relative to the base member and extends on both sides of the common plane of the occlusal plane indicators.

10. The registration device of claim 9, wherein, when the esthetic parameters registration rod is attached to the base member, on each side of the common plane of the occlusal plane indicators, at least one indicator device is displaceably attached to the esthetic parameters registration rod.

11. A system for the registration of facial topographic parameters, comprising:
    the registration device of claim 1; and
    a referencing member comprising:
       a referencing plate having a principal plane, and
       a coupling configured to mate with the rotationally immobile coupling of the transverse section of the registration device to rotationally immobile couple the referencing plate to the registration device.

12. The system of claim 11, wherein the coupling of the referencing plate and the coupling of transverse section are mutually configured to couple the referencing plate to the registration device in a position in which the principal plane of the referencing plate is parallel to the common plane of the two occlusal plane indicators.

13. The system of claim 11, wherein the coupling of the referencing plate and the coupling of the transverse section are mutually configured to attach the referencing plate to the registration device with the principal plane of the referencing plate being coincident with the common plane defined by the two occlusal plane indicators.

14. A method for registering facial topographic parameters of a face, the method comprising:
    attaching a referencing plate to teeth of a mandible and fixing the referencing plate to the teeth, wherein a principal plane of the referencing plate is coincident with an occlusal plane of the mandible;
    attaching the registration device of claim 1 to the referencing plate, wherein the occlusal plane indicators are parallel to the principal plane of the referencing plate, and wherein a mandibular condyle indicator pointer and a tragus indicator are provided on each lateral side of the referencing plate;

displacing each mandibular condyle indicator pointer in a respective sagittal plane on each side of the referencing plate;

placing each mandibular condyle indicator pointer coincident with a mandibular condyle on each side of the referencing plate in the sagittal plane, to mark a respective position of the mandibular condyles of the mandible on each side of the referencing plate;

pivoting the tragus indicator on each lateral side of the referencing member around a respective tragus indicator pivot axis;

positioning a tragus indicator pointer of each tragus indicator on a line connecting the mandibular condyle and a respective tragus;

reading at least one parameter indicative of a distance from the occlusal plane to the mandibular condyle indicator pointers perpendicular to the occlusal plane and an anterior-posterior position of the mandibular condyle indicator pointers parallel to the occlusal plane; and reading at least one parameter indicative of a distance from the occlusal plane to the tragus indicator pointers perpendicular to the occlusal plane and an anterior-posterior position of the tragus indicator pointers parallel to the occlusal plane.

15. The method of claim 14, wherein the registration device comprises two mandibular condyle indicator beams, a respective mandibular condyle indicator beam being pivotably coupled to each lateral side of the transverse section and pivotable around a pivot axis, wherein the mandibular condyle indicator beams are pivotable in a sagittal plane on each lateral side of the referencing member, and wherein one of the mandibular condyle indicator pointers is coupled to each one of the mandibular condyle indicator beams and distant from the respective pivot axis of the respective mandibular condyle indicator beam, a distance between the mandibular condyle indicator pointer and the respective pivot axis being variable, and the method further comprising:
pivoting the mandibular condyle indicator beams around their respective pivot axis to vary an inclination angle between the mandibular condyle indicator beams and the occlusal plane indicator on each side of the registration device; and varying the distance between the mandibular condyle indicator pointer and the respective pivot axis of the respective mandibular condyle indicator beam on each lateral side of the referencing member.

16. The method of claim 14, further comprising transferring the read parameters to a remote device.

17. The method of claim 16, wherein transferring the read parameters to the remote device comprises transferring landmarks of facial topography to a remote location.

18. The method of claim 16, further comprising assessing a functional and an esthetic effect of a dental restoration based on the read parameters.

* * * * *